United States Patent [19]
Leedom et al.

[11] 3,993,863
[45] Nov. 23, 1976

[54] DISC RECORD GROOVE SKIPPER

[75] Inventors: Marvin Allan Leedom, South Brunswick Township; John Clifford Bleazey, Trenton, both of N.J.

[73] Assignee: RCA Corporation, New York, N.Y.

[22] Filed: Aug. 22, 1974

[21] Appl. No.: 499,557

[52] U.S. Cl. .................. 178/6.6 DD; 179/100.41 P; 178/6.6 R; 178/6.6 FS; 360/10; 179/100.4 D
[51] Int. Cl.² .......................................... H04N 5/76
[58] Field of Search ............. 179/100.3 V, 100.4 D, 179/100.41 P, 100.41 G; 178/6.6 A, 6.6 R, 6.6 P, 6.6 DD, 6.6 FS; 360/103, 10

[56] References Cited
UNITED STATES PATENTS

| 3,247,404 | 4/1966 | Batsch | 179/100.41 P |
| 3,530,258 | 9/1970 | Gregg et al. | 179/100.3 V |
| 3,530,447 | 9/1970 | Lambert | 179/100.4 D |
| 3,691,318 | 9/1972 | Schuller et al. | 178/6.6 A |
| 3,706,861 | 12/1972 | Giel | 360/103 |
| 3,767,848 | 10/1973 | Schuller | 178/6.6 R |

OTHER PUBLICATIONS

"Control Mechanisms in the Philips 'VLP' Record Player"; Philips Tech. Rev. 33, pp. 190–193, 1973, No. 7; by P. J. M. Janssen.
"A Review of the MCA Disco–Vision System" by Broadbent, pp. 554–559; July, 1974; Journal of the SMPTE.

Primary Examiner—Daryl W. Cook
Assistant Examiner—Alan Faber
Attorney, Agent, or Firm—Eugene M. Whitacre; Stephen Siegel; William H. Meagher

[57] ABSTRACT

A signal pickup stylus which cooperates with an information storing spiral groove on a video disc record is caused to selectively skip groove convolutions of the disc record to produce special effects including stop, fast-forward and reverse motion of the displayed image.

13 Claims, 9 Drawing Figures

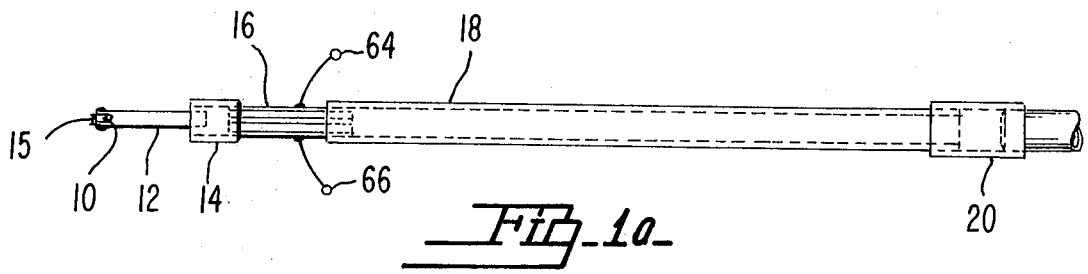
Fig_1a_
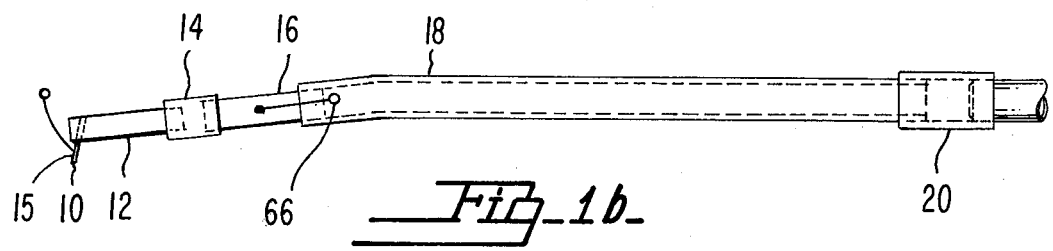
Fig_1b_
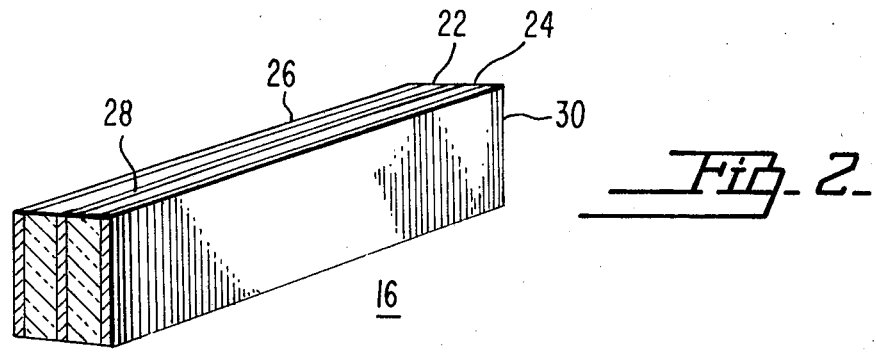
Fig_2_
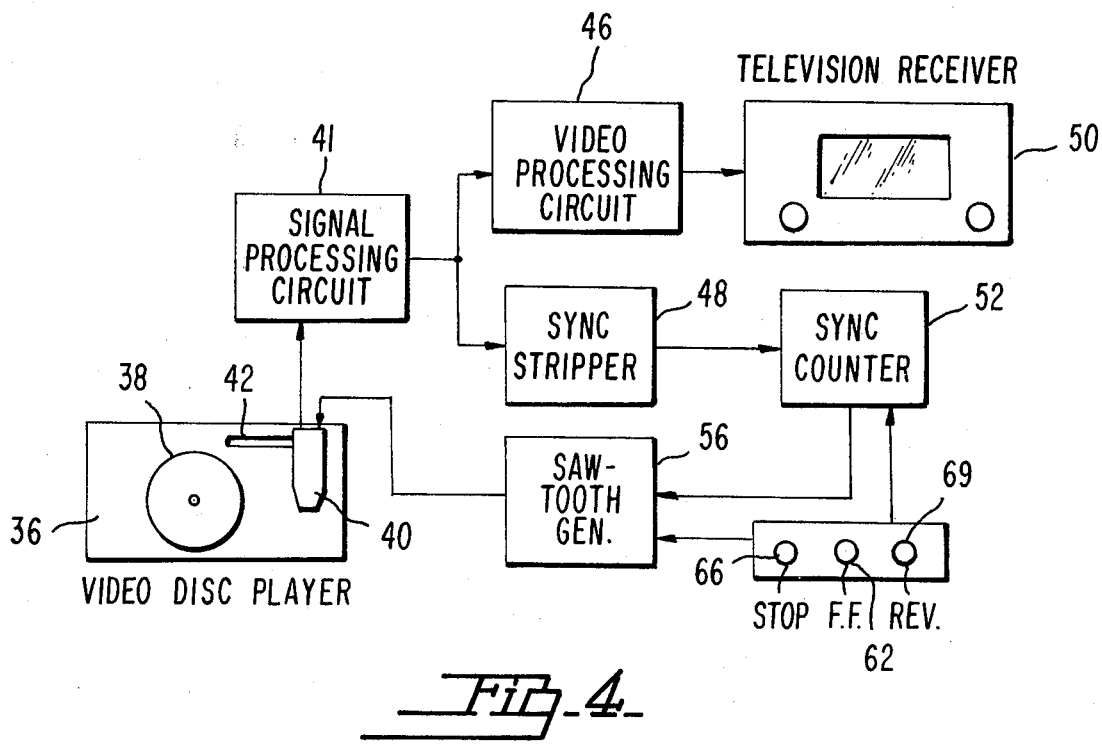
Fig_4_

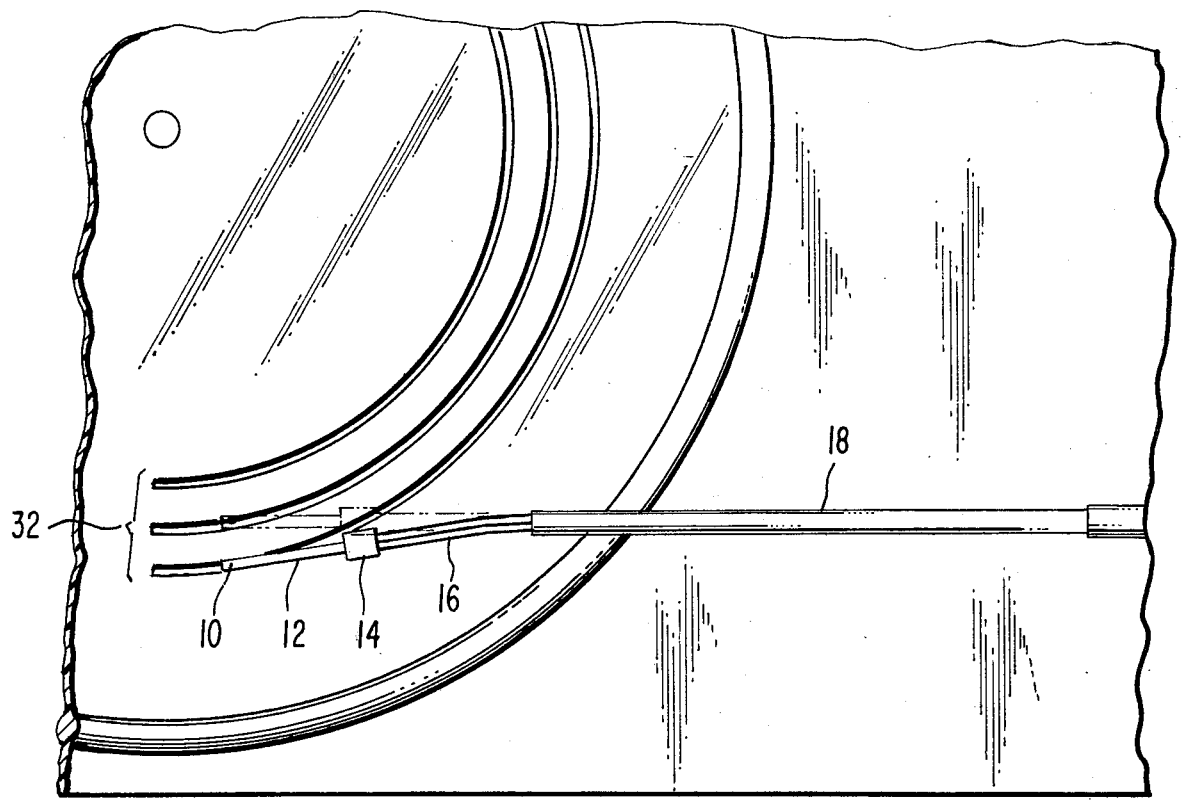
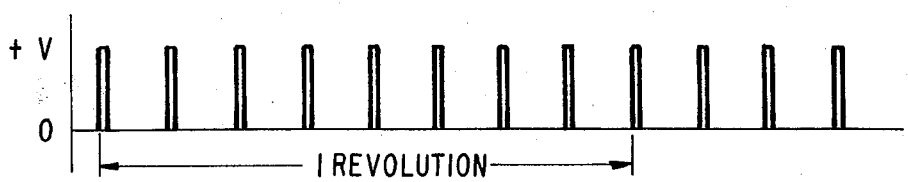
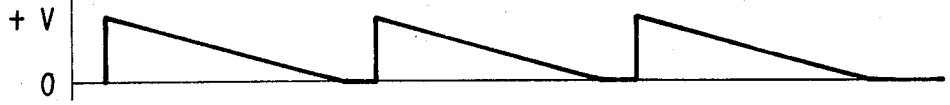

DISC RECORD GROOVE SKIPPER

This application is concerned with apparatus utilized in the playback of a video disc record and more particularly to apparatus for repositioning a signal pickup stylus from one convolution to another of a signal encoded spiral groove on the disc record.

In one configuration of a video disc player system, signal information is topographically formed in a spiral groove of a disc substrate. The spiral groove and topographic information is thereafter coated with a thin layer of metal and an insulating layer of, for example, styrene, formed over the metallic coating. The recorded disc may then be rotated on the turntable of a playback mechanism and a signal pickup stylus caused to ride in the spiral groove. An electrode portion of the pickup stylus cooperates with the styrene dielectric coating on the record and the metal layer thereunder to form a capacitor. Capacitance variations representative of the topographic pattern in the playback disc are detected by associated electronic circuitry and the signal recorded on the disc thereby decoded. A video disc playback system of this type is described in a co-pending U.S. application entitled, INFORMATION RECORDS AND RECORDING/PLAYBACK SYSTEMS THEREFOR, by Jon K. Clemens, Ser. No. 126,772, now U.S. Pat. No. 3,842,194.

Video disc player systems of the type described above generally utilize playback discs having groove densities in the order of four to eight thousand groove convolutions per inch. A typical video disc of this type may therefore have a groove spacing in the order of about 3.5 microns. The relatively narrow groove spacing requires a tracking signal pickup stylus which is capable of following these relatively narrow grooves. Further, it is desirable to provide a pickup stylus and associated support arm that will follow the narrow spiral groove even when the groove is eccentric with respect to the center hole in the disc, i.e., when the center hole of the disc is not precisely centered on the record. The signal tracking stylus and associated support arm is therefore desirably constructed with a relatively low mass in order to follow any lateral shift in position of the spiral groove.

In certain particular applications of a video disc system, it may be desirable to provide stop motion of the displayed image. That is, to repetitively provide output signals of basically the same displayed image on an associated television monitor. Such image stop motion may be desirable for allowing a viewer to observe a particular image for relatively long lengths of time. Also, in data storage systems where it may be desirable to store frames of text book type material, the ability to linger on a particular displayed image is of particular importance.

A further desirable feature for incorporation with a video disc player is the ability to provide rapid forward motion or reverse motion of the displayed image. A rapid forward function is particularly useful for scanning information recorded on the video disc. A reverse motion function may also be utilized for aiding in data retrieval and is particularly useful as a teaching aid for reviewing an instructional picture sequence recorded on the disc.

It will be appreciated that disc records having high groove densities may be subject to an occasional flaw causing the spiral groove to prematurely terminate. Such premature termination, referred to as a "locked groove," may result in an undesired repetition of a groove convolution during record playback. It is therefore desirable to incorporate in a video disc player apparatus suitable for repositioning the signal pickup stylus out of a locked groove.

Apparatus for repositioning a signal pickup stylus from one convolution on a spiral grooved disc record to another convolution is comprised of a means coupled to the stylus for supporting the stylus in relationship with the spiral groove. Positioning means are interposed between the stylus and the support means for responsively providing lateral motion to the stylus with respect to the support means. Control means are coupled to the positioning means and provide signals to control the amplitude and direction of lateral movement of these positioning means.

A better understanding of this invention may be derived from the following specification when taken with the drawings of which:

FIGS. 1a and b are respective top and side views of a stylus and support member embodying the invention;

FIG. 2 is a perspective drawing of a bimorph piezoelectric element utilized with the apparatus of FIG. 1;

FIG. 3 is an exaggerated top view of the apparatus of FIG. 1 in operational relationship with a portion of a video disc;

FIG. 4 is a block diagram of a video disc player and circuitry utilized to operate the apparatus of FIG. 1; and FIGS. 5a–5d illustrate the timing and sawtooth shaped signals utilized to control the apparatus of FIG. 1.

In FIGS. 1a and 1b, a stylus 10 is fastened to a mounting structure 12. Stylus 10 comprises a metal electrode 15 fastened to an insulating material such as sapphire. The mounting structure 12 comprises a plastic rectangular structure having an end portion with a notch cut therein suitable for receiving stylus 10. Epoxy cement or other suitable bonding material may be utilized to bond stylus 10 to mount 12. An end portion of compliant coupling member 14 is fastened to an end of stylus mount 12. Member 14 may be constructed of rubber or other suitable compliant material. A piezoelectric, bimorph element 16 is fastened to another end of coupling member 14. Wires 64 and 66 are fastened to metal layers on each side of bimorph element 16 for providing electrical connections to this element. Epoxy bonding material may be utilized at each end of coupling member 14 to respectively secure stylus mount 12 and bimorph element 16 thereto. A support arm 18 is fastened to an opposite end of bimorph element 16 and to a pivot member 20. Support arm 18 may be comprised of a relatively light material such as thin wall aluminum tubing.

Bimorph element 16, as shown in FIG. 2, is comprised of an alternating series of layers of metal and piezoelectric material. A first metal layer 26 is followed by a piezoelectric element layer 22, followed by a second metal layer 28, a second piezoelectric element 24 and a final layer of metal 30. By arranging the piezoelectric material 22 and 24 in the configuration shown in FIG. 2, a bimorph structure may be realized. A bimorph or bending mode structure is made from the apparatus illustrated in FIG. 2 by properly polarizing piezoelectric elements 22 and 24. Elements 22 and 24 are polarized by first applying an electric potential of the same polarity to metal layers 26 and 30 with a common electrical return connection to metal layer 28. The piezoelectric and metal structure is thereafter placed in an environment of elevated temperature. The particular temperature required to make the structure bimorph is the Curie Temperature of the piezoelectric material. When the piezoelectric structure is properly cooled, the piezoelectric elements become polarized and the potentials applied to the metal layers 26, 28 and 30 are removed. The resultant polarization is such that element 22 is the opposite polarity from that of element 24 with respect to the outer metal layers 26 and 30. Thereafter, by applying an appropriate potential across metal layers 26 and 30, one of the piezoelectric elements will contract and the other expand causing the entire bimorph structure to bend in a direction dictated by the polarity of the applied potential. By applying a particular potential of given polarity across metal layers 26 and 30, a bending motion of the bimorph element 16 is implemented as illustrated in FIG. 3.

In order to effectively control the bending motion of bimorph element 16, the apparatus illustrated in FIG. 4 is utilized. FIG. 4 illustrates a video disc player 36 upon which a pre-recorded video disc 38 is rotated on an associated turntable. An arm housing 40 encloses the apparatus illustrated in FIGS. 1a and 1b and is arranged to be positioned over video disc 38 by sliding along slot 42. A detailed description of an arm housing is given in a copending U.S. application in the name of Marvin A. Leedom entitled, VIDEO PLAYBACK SYSTEM TRACKING ARM AND PICKUP ASSEMBLY, Ser. No. 314,976, now U.S. Pat. No. 3,882,267. Capacitance variations measured between the disc 38 and the stylus 10 are coupled to signal processing circuit 44 wherein decoding occurs and a video signal produced. Signals provided by signal processing circuit 44 are coupled to a video processing circuit 46 and a sync stripper 48. Video processing circuit 46 rearranges the luminance and chrominance constituents of the video signal into a format suitable for decoding by television receiver 50. A video processing circuit is described in a copending U.S. application entitled, BURIED CARRIER DECODING SYSTEM, in the name of John G. Amery et al., Ser. No. 351,036, now U.S. Pat. No. 3,872,497. Video signals rearranged by processing circuit 46 are coupled to a television receiver 50 where they may be displayed on an associated image display device. Sync signals provided by sync stripper 48 are coupled to a sync counter 52. Sync counter 52 in response to signals from a control unit 54 provides an output signal which repetitiously occurs at a predetermined whole number division of the frequency of the applied vertical sync signals. A sawtooth generator 56 receives signals from both sync counter 52 and control circuit 54 and responsively provides sawtooth output signals. These sawtooth output signals are coupled to bimorph element 16 through lines 64 and 66 (see FIG. 1) and operate to control the bending motion of this element.

In the operation of the above-described circuitry, a displayed image may be caused to effectively stop, move rapidly forward or move in a reverse action. To provide stop motion playing from a video disc record, it is necessary to repetitively play the information played for a previous television frame. A simulated stop motion can also be had by replaying several frames repeatedly. In one particular type of video disc recording, four television frames are recorded in each convolution of a video disc record. To provide an effective stop motion of the image reproduced with this type of video disc recording, the stylus 10 may be repeatedly repositioned in an adjacent outer convolution of the disc after each disc revolution. In other words, four frames of video information may be continuously repeated by causing the stylus 10 to skip to an adjacent outer convolution at the same position on the record during each revolution.

Fast-forward play of the video disc record may be implemented by causing the stylus 10 to skip to an adjacent inner convolution (towards the center of the record) at particular portions of the convolution in which it is riding. For example, the stylus may be made to skip to an adjacent inner groove convolution at each half revolution of the video disc record. The resultant image produced by playing ones and skipping others of the recorded frames appears in a speed-up sequence.

Similarly, reverse motion of the displayed image can be effected by causing the pickup stylus 10 to shift groove convolutions towards the outside of the record disc after, for example, each half revolution of disc rotation. This, in effect, causes the pickup stylus and arm to slowly move towards the outside of the disc. In other words, the video disc player 36 is caused to play two frames in the forward direction and then caused to skip back four frames and play two more in the forward direction and so on progressing towards the beginning of the record disc.

To effect stop motion of the displayed image, the stop button 60 of control panel 54 is depressed. Stop button 60 engages the divide by eight portion of sync counter 52 and further sets the polarity of the output signal provided by sawtooth generator 56. Sync counter 52 receives vertical sync pulses from sync stripper 48 during the vertical blanking interval of each television field. There are eight television fields per revolution of the video disc corresponding to four television frames. Vertical timing pulses corresponding to vertical sync signals are illustrated in FIG. 5a. When eight vertical sync signals have passed into sync counter 52, an output signal is developed and applied to sawtooth generator 56. Sawtooth generator 56 generates a sawtooth waveform having a sharp rise time corresponding to the initiation of the input signal provided by counter 52 (see FIG. 5b). The sharp rise in voltage causes the bimorph element 16 in pickup arm 40 to rapidly bend, moving stylus 10 to an adjacent groove convolution towards the outside of the video disc. The amplitude of the applied sawtooth signal thereafter diminishes towards a quiescent value allowing the support arm 18 to slowly move towards the new convolution position (see FIG. 3). The relatively small mass of the structure between bimorph element 16 and the tip of stylus 10 in comparison to that of support arm 18 assures movement of stylus 10 when element 16 is caused to bend rapidly. By applying a sawtooth shaped waveform to the bimorph element 16 once each revolution and particularly during the vertical blanking interval, the pickup stylus can be caused to continuously read-out the signal information in one complete convolution without disturbing the displayed image. A continuous read-out from one groove convolution allows a continuous play of the four frames of video information recorded in this groove. Hence, if the signal information during the four frames of this one convolution is substantially the same and without motion, then a signal read-out appearing as a still image will be produced on the television monitor. If, however, the signal information during the four frames of the repeated convolution is that of an image in motion, then the repetitious playback of the four frames will show a continuous repeat of the motion occurring during the four frame interval. This type of motion display is particularly useful when instructional information is recorded on the video disc such as, a tennis or a golf lesson, where it may be desirable to show a particular motion of, for example, a tennis or golf swing. An audio blanking system, not shown, may further be incorporated with the switches of switch panel 54 for blanking the audio signal output to the television receiver during such stop motion, fast-forward or reverse motion.

Depression of the fast-forward button 62 engages the divide by four portion of sync counter 52 providing thereby an output signal from this counter that corresponds to each four vertical sync pulses or each half revolution of the video disc record. Sawtooth generator 56 is further engaged by fast-forward button 62 to provide signals of opposite polarity from those utilized for either stop motion or reverse action (see FIG. 5d). Hence, upon depression of the fast-forward button 62, a sawtooth pulse is generated at each half revolution of the video disc record during the vertical blanking interval causing the bimorph element 16 to bend towards the center of the disc shifting stylus 10 to an adjacent groove convolution closer to the center of the disc record. The forward shifting motion of stylus 10 towards the center of the disc at each half revolution of the disc causes the pickup apparatus to sense spaced groups of two frames skipping four frames in between. This frame skipping motion, as mentioned above, effects a fast-forward motion of the displayed image.

In a similar manner to that used for fast-forward, reverse action of the displayed image may be obtained. Depression of reverse button 64 causes the sync counter to operate in a divide by four mode as was done for the fast-forward motion. The sawtooth generator 56 is further caused to provide a sawtooth pulse having the same polarity as that provided for stop motion (see FIG. 5c). When reverse button 64 is engaged, a series of sawtooth waveforms are generated causing the bimorph element 16 to bend correspondingly towards the outside of the disc and successively reposition the stylus 10 into adjacent groove convolutions. Each sawtooth waveform is developed after one half revolution of the disc record. This results in playback of television frames wherein two frames are played followed by two frames immediately preceding the two frames just played and so on. Video playback in such a sequence results in a reverse motion of the displayed image.

A further application of the subject groove skipper apparatus is in the removal of the signal pickup stylus from a locked groove. A locked groove, as described earlier, is one which causes the signal pickup stylus to repetitively play the same groove convolution. When a locked groove exists due to a flaw in the record, it may be desirable to reposition the stylus out of such locked groove and into the next adjacent groove convolution. Removal of the signal pickup stylus from a locked groove may be facilitated by monentarily engaging the fast-forward button 62 and thereby causing the signal pickup stylus to be repositioned in a groove convolution closer to the center of the disc record. In the alternative, a system for sensing the presence of a locked groove may be incorporated with the subject groove skipper apparatus for automatically repositioning the signal pickup stylus out of a locked groove.

In one particular example of the above apparatus, a sapphire stylus was utilized having a height of about 90 mils, a width of about 5 mils and a depth of about 15 mils. The weight of the stylus was about 0.3 milligrams. The stylus mount utilized to fasten stylus 10 to the rubber decoupling member 14 was made of plastic material having a weight of about 2 ½ milligrams. A butyl rubber decoupling member 14 having a hardness of about 40 durometers provided a desired amount of compliance and damping. This decoupling member had a diameter of about 1/16 of an inch and a length of about ⅛ of an inch. The bimorph element was approximately 25 mils on each side and ¾ of an inch long. The bimorph element was constructed of PZT-5 and obtained as a completed unit from the Cleveite Corporation, Bedford, Ohio. A 100 volt peak-to-peak sawtooth waveform was utilized to provide a stylus movement in the order of 5 mils.

Although the subject apparatus has been described with a capacity sensing stylus, other types of signal pickup devices such as those incorporating piezoelectric material may also be utilized.

What is claimed is:

1. A system for repetitively tracking a selected convolution of a spiral groove of a rotating disc record containing recorded information including regularly recurring signals, comprising:
   a signal pickup stylus for recovering said recorded information;
   a pivoted support arm for positioning said stylus in the groove of said disc record during rotation thereof;
   a bimorph element mechanically interposed between said stylus and said support arm and normally in alignment with said support arm, but subject to bending out of said alignment upon electrical actuation;
   control means electrically coupled to said bimorph element for selectively providing actuation thereof once each disc record revolution; and
   means responsive to said regularly recurring signals recovered by said stylus for timing said actuations.

2. Apparatus according to claim 1 wherein said control means includes a generator for supplying to said bimorph element an actuating wave having a rapid amplitude increase followed by a relatively slow amplitude decrease towards a quiescent value.

3. In a disc player for use with a disc record having a spiral, information-storing groove in a surface thereof; said player including a signal pickup stylus subject to reception in a disc record groove during rotation of the disc record, and normally subject upon said reception to retention within said groove by the walls of said groove during said rotation of the disc so that the information stored in successive convolutions of said spiral groove is recovered in sequence by said stylus; said stored information including time varying signal components and regularly recurring components; apparatus for selectively changing the groove convolution in which said pickup stylus is retained comprising:
   a pickup arm pivotally mounted at one end in such manner that the other end of said pickup arm overlies the groove surface of the disc record during playback thereof;
   a bimorph element having a first end and a second end and a pair of energizing terminals and comprised of piezoelectric material, said bimorph element normally having a straight configuration between said ends, but subject to bending therebetween when an energizing potential is applied across said energizing terminals; said first end of said bimorph element being secured to said other end of said pickup arm;

means secured to said second end of said bimorph element for holding said stylus, the mass of said stylus and said holding means secured to said second end being sufficiently smaller than the mass of said pickup arm secured to said first end as to ensure movement of said second end about said first end when said bending of said bimorph element occurs; and control means for selectively applying said energizing potential across said bimorph element terminals; wherein the magnitude of said selectively applied energizing potential, and the orientation of said bimorph element, are such that said bending-responsive motion of said second end imparts motion to said stylus, in a direction transverse to the axis of said groove, and of sufficient magnitude to override a groove wall.

4. Apparatus according to claim 3 wherein said control means includes a generator coupled to said bimorph element terminals for applying when actuated, an energizing wave thereto having a rapid amplitude increase followed by a relatively slow amplitude decrease to a quiescent value; and selectively operable means responsive to said regularly recurring signals recovered by said stylus for actuating said generator.

5. Apparatus in accordance with claim 4 wherein said actuating means includes means for developing generator actuating waves timed to cause each initiation of said bimorph element bending to occur during recovery of one of said recurring signals.

6. Apparatus in accordance with claim 5 wherein said bimorph element is so contructed as to impart said stylus motion in a direction away from the center of said disc in response to an energizing wave of a first polarity applied by said generator, and in a direction toward the center of said disc in response to an energizing wave of a second polarity applied by said generator, and wherein said control means includes means for selecting the polarity of said energizing waves.

7. Apparatus according to claim 3 wherein said control means is operative: in a first mode for imparting said stylus motion in a direction away from the center of said disc record once each disc record revolution; in a second mode for imparting said stylus motion in a direction toward the center of said disc record; and in a third mode for imparting said stylus motion in a direction away from the center of said disc record more than once each disc record revolution.

8. In a disc record player mechanism in which a signal pickup stylus is normally retained within a spiral, information-storing groove of a rotating disc record during playback thereof, apparatus for selectively changing the groove convolution in which said pickup stylus is retained comprising:

a stylus support arm pivotally mounted at one end thereof;

means for mechanically coupling said stylus to the other end of said support arm, said coupling means including electrically actuated bending means for imparting lateral motion to said stylus with respect to said support arm, in response to control signals, to a degree permitting shift of said stylus between adjoining convolutions of said groove; and control means electrically coupled to said bending means for selectively developing said control signals to control the lateral movement of said stylus with respect to said support means.

9. Apparatus according to claim 8 wherein:
said bending means comprises a bimorph structure of piezoelectric material; and wherein
said bimorph structure has at least two electrodes secured to portions of said pieozelectric material and electrically coupled to said control means for reception of said control signals.

10. Apparatus according to claim 9 wherein said support arm comprises a length of thin wall tubing coupled to one end of said bimorph structure; and
compliant means coupled between the other end of said bimorph structure and said stylus.

11. Apparatus according to claim 10 including a stylus mounting means interposed between said stylus and said compliant means for supporting said stylus; and
wherein said compliant means comprises an elastic section of tubing having an opening at each end suitable for receiving respective end portions of said bimorph element and said stylus mounting means.

12. Apparatus according to claim 10 wherein said control means includes:
a generator for providing said control signals with a rapid amplitude increase followed by a relatively gradual descent to a quiescent value; and
means for selectively energizing said generator.

13. In a video disc player, including a signal pickup stylus, subject to reception in a spiral groove of a rotating video disc, for recovering from successive regions along said disc groove stored composite video signals inclusive of picture components and recurring deflection synchronizing components, said deflection synchronizing components occurring during recurring blanking intervals interleaved with intervals occupied by said picture components; the combination comprising:

a support structure for said stylus including a pivoted stylus support arm, and a normally straight piezoelectric element mechanically coupled to said stylus support arm, said piezoelectric element being subject selectively to bending toward or away from the axis of rotation of said video disc upon electrical actuation thereof;

said piezoelectric element effecting, when actuated, a lateral motion of said stylus with respect to said disc groove of sufficient magnitude to move said stylus between adjacent convolutions of said spiral groove; and means, responsive to the composite video signals recovered by said signal pickup stylus, for selectively actuating said piezoelectric element only during selected ones of said recurring blanking intervals.

* * * * *